March 1, 1960 R. N. JONES ET AL 2,927,209
SPECTROMETRIC CELL STRUCTURE AND CHARGING METHOD THEREFOR
Filed July 5, 1957 3 Sheets-Sheet 1
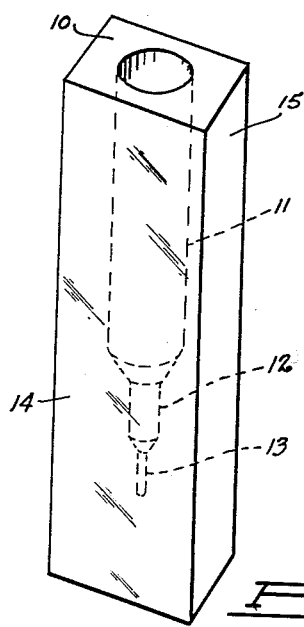
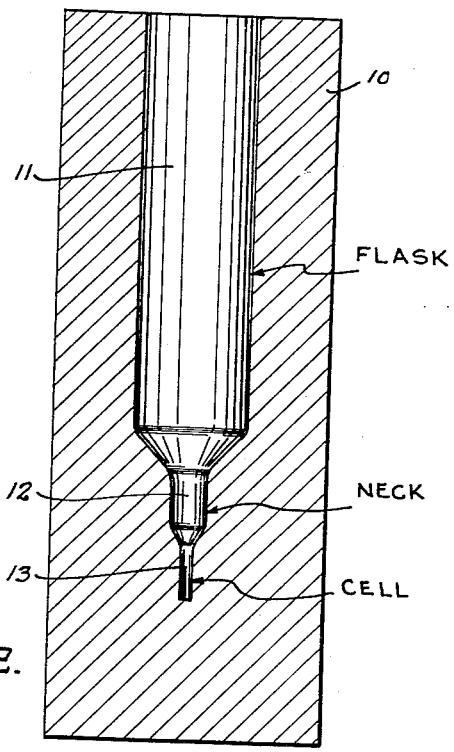
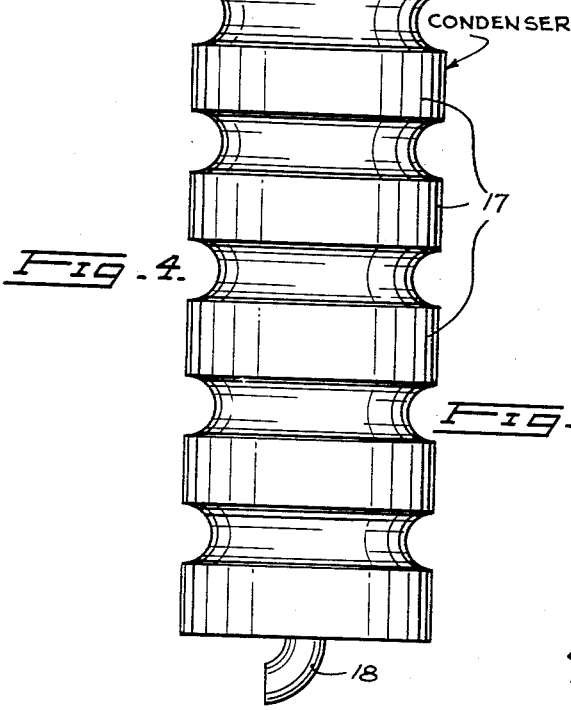
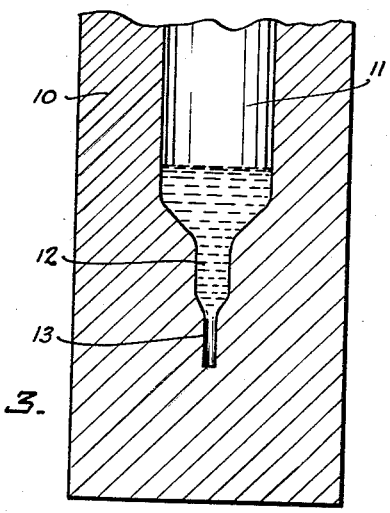

March 1, 1960  R. N. JONES ET AL  2,927,209
SPECTROMETRIC CELL STRUCTURE AND CHARGING METHOD THEREFOR
Filed July 5, 1957  3 Sheets-Sheet 2
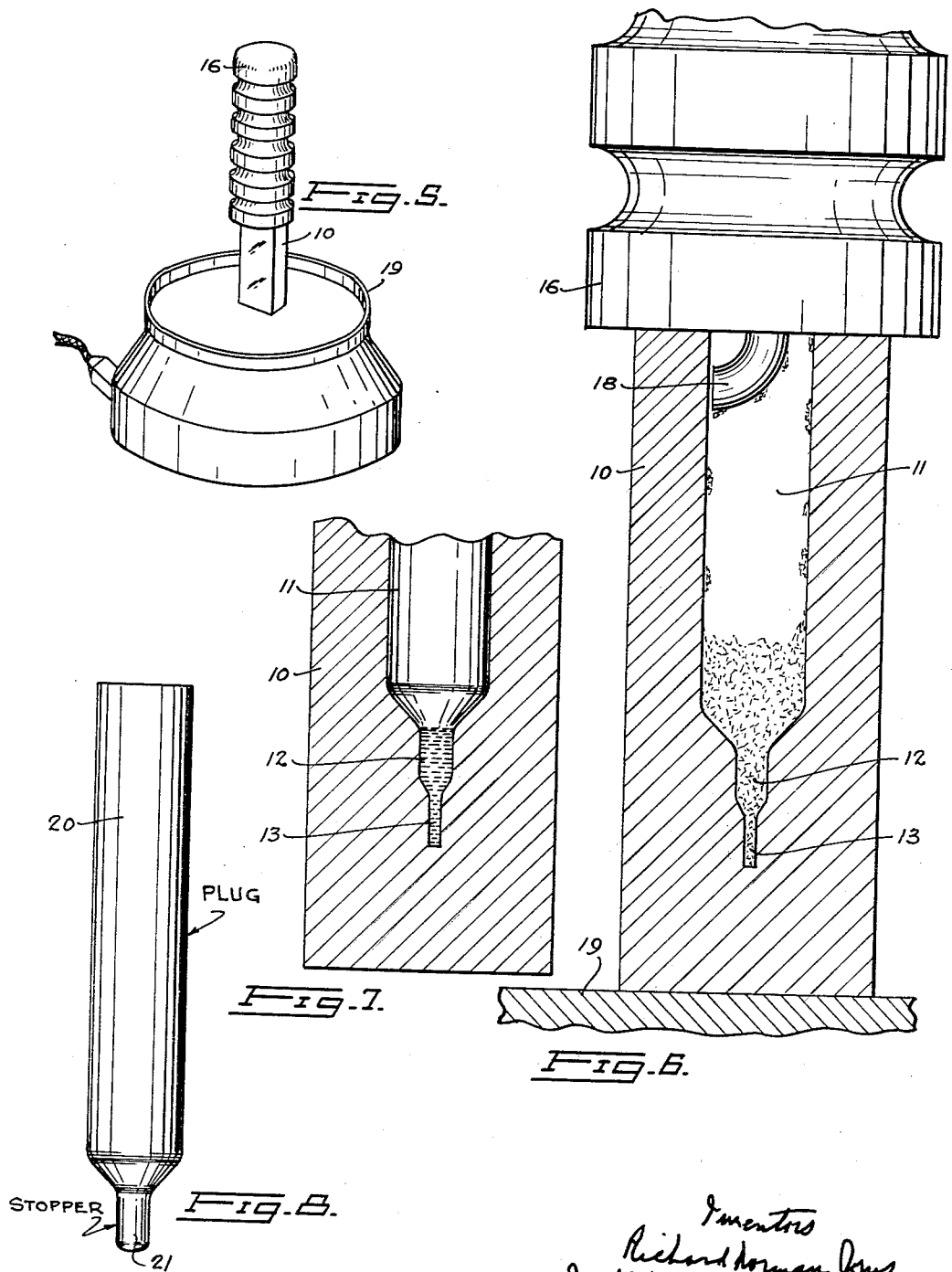

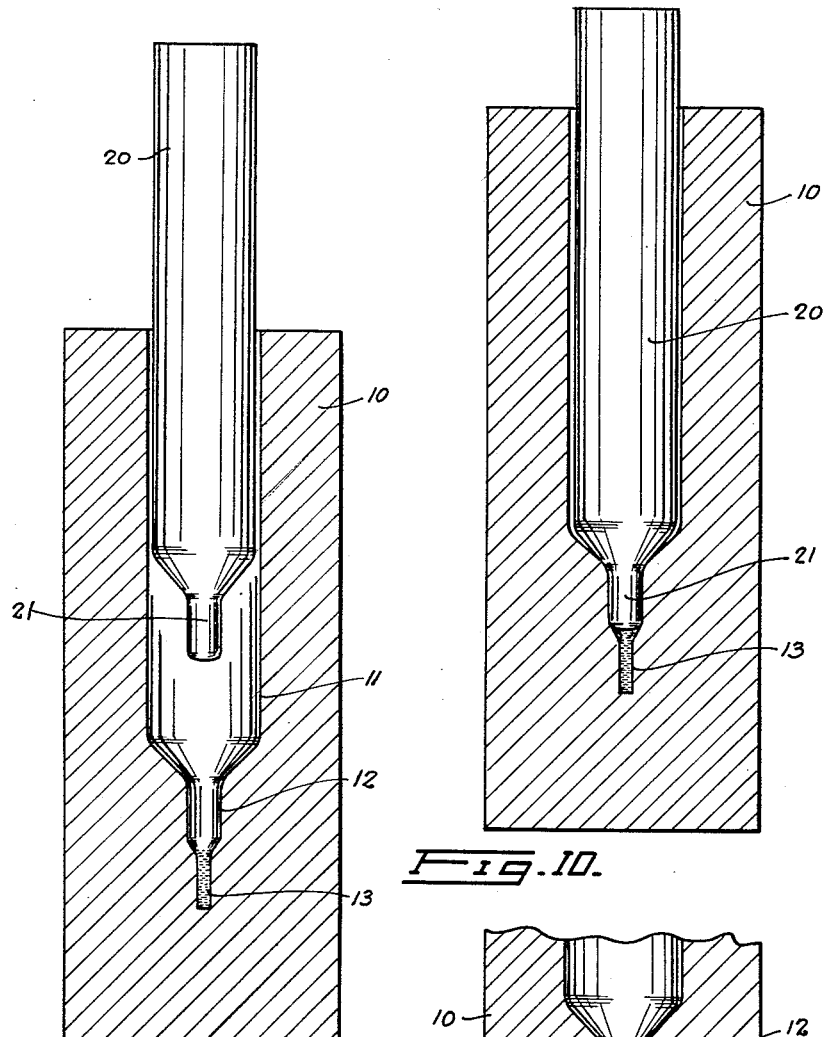

ic Office

2,927,209
Patented Mar. 1, 1960

2,927,209

SPECTROMETRIC CELL STRUCTURE AND CHARGING METHOD THEREFOR

Richard Norman Jones, Ottawa, Ontario, and Joseph Marcel Armand Nadeau, Quebec, Canada Application July 5, 1957, Serial No. 670,153

22 Claims. (Cl. 250—43.5)

This invention relates to the construction, and manner of charging, of cells of the type employed for mounting specimens for spectrometric examination.

The use of spectral analysis, particularly infrared spectral analysis, is now a well established laboratory technique for the identification of organic compounds, and infrared spectrometers have become standard equipment in most laboratories concerned with organic chemical analysis.

In certain fields of activity, especially in medical research and diagnosis, criminal investigations and other forensic examinations, the use of infrared spectrometers has often been limited by the extremely small samples of material available for examination. A standard commercial "macroscopic" infrared spectrometer can obtain a satisfactory analysis from a sample of a size of about 1 milligram. "Microscopic" equipment has also been developed, in which the acceptable minimum size of the sample that can be examined is reduced by a factor of 10, i.e. to approximately 0.1 milligram (100 micrograms).

It can be demonstrated that spectrometers now available employing micro-illuminators are themselves capable of obtaining a satisfactory spectral analysis from a sample in the "ultra-microscopic" range, i.e. below approximately 50 micrograms, and, in certain cases, even down as low as 1 microgram. It has not, however, been possible to take advantage of this ability of spectrometers because of the difficulties encountered in satisfactorily mounting such a small sample for examination.

The preferred method at present in use for mounting a sample in a spectrometer is to dissolve it in a suitable solvent. The basic requirements for the solvent are that it should be chemically inert both towards the sample and towards the material of which the cell is constructed; also that the sample should be sufficiently soluble in the solvent. It is also necessary that the solvent have satisfactory optical properties; it must be optically transparent to the radiation being employed in the spectrometer, i.e. not only must it transmit the radiation, but it should not to any appreciable degree modify such radiation, because any such modification would swamp the characteristic spectral modifications imparted to the radiation by the sample in solution.

Hitherto, this liquid method of forming mountable specimens (the term "sample" is used herein to denote the material for analysis; the term "specimen" is used to denote the combination of sample and vehicle that is placed in the spectrometer for examination) has not proved practicable in the ultra-microscopic range of sample size, and it has been necessary to adopt the solid vehicle technique. In this technique the sample is first dissolved in a suitable solvent and then added to about 200 times its own weight of a suitable powdered material, usually potassium bromide. The solvent is then driven off and the powdered mixture of sample and solid carrier is placed in a press and subjected to high pressure. The potassium bromide turns into a form of glass under this treatment, producing a transparent disc which can be mounted in the spectrometer with comparative ease. Satisfactory spectra can be obtained from radiation passed through such discs, but their interpretation is complicated, because the spectrum depends on the crystalline structure as well as the molecular structure of the compound.

For this reason the liquid vehicle technique is preferred optically, but has not been possible in the ultra-microscopic range, because of hitherto insurmountable manipulative difficulties.

If the specimen is available in bulk, it is a comparatively easy matter to mount a portion of it containing only an ultra-microscopic quantity of the sample, in a cell for examination, from which it can be established that the spectrometers available are able to obtain satisfactory data from such a small amount of a sample. The real difficulty arises when only an ultra-microscopic amount of the sample is available in the first place. Since the lower limits of satisfactory operation of the spectrometer are being approached, it becomes necessary to ensure that substantially the whole of such sample is transferred to the cell for mounting in the spectrometer beam.

To provide a satisfactory solution to this problem is one of the objects of the present invention.

Another object of the present invention is to provide an improved cell-containing device that will be considerably simpler than existing devices and consequently cheaper to manufacture.

Cell-containing devices in use at the present time are of comparatively complex structure involving many separate pieces of different materials, including precision made metal parts, fabricated into a comparatively complex assembly. As a result, these devices are expensive and it is only economical for a laboratory to keep on hand a comparatively small number of them. They must be thoroughly washed out after each use and carefully stored for further use.

In this aspect of providing a simpler and cheaper cell-containing device, the present invention is concerned not only with ultra-microscopic quantities of a sample, but also with the microscopic and macroscopic fields, and may be defined as a device for mounting a specimen for spectrometric examination, said device comprising a unitary body formed from a single block of a material chemically inert to the specimen and optically transparent to the radiation of the spectrometer, said body being provided with a first cavity extending inwardly from a face thereof and a second cavity communicating with said first cavity but otherwise closed, said second cavity having a substantially smaller cross-section than said first cavity.

In some instances, i.e. when rock salt is the material, a single crystal is necessary optically. On the other hand, other usable materials such as silver chloride may be in the form of a glassy fused mass.

Preferably, a three stage cavity arrangement is employed, the smallest cavity forming the cell. In use, after the cell has been charged as hereinafter described, a resilient closure member is engaged with the body of the device to confine the specimen in the smallest or smaller cavity.

The invention, in its aspect that affords a solution to the problem of charging the cell when only a very small amount of the sample is available, may be considered broadly as a method for setting up a sample-containing specimen in a cell cavity formed in a device for mounting such specimen in a spectrometer and having a main cavity communicating with said cell cavity, said method comprising forming a solution by dissolving the sample in a solvent, introducing said solution into said main cavity and concentrating said solution by evaporating said solvent in such a manner as to confine said sample to said cell cavity. Preferably, this concentrating step is continued until only the sample remains as a solid deposit on the walls of the cell, a second solvent then being introduced to form the final specimen. For practical manipulative reasons more of this second solvent than is necessary to form the specimen required, is added, and so a second concentration is effected until the desired specimen volume is obtained. By adopting this two stage method, it becomes possible to employ a solvent for the first stage that need not have the strict optical properties necessary in the final solvent.

Thus, if the preferred form of the device aspect of the invention is employed for carrying out the preferred form of the process aspect of the invention, the result is a method for setting up a sample-containing specimen in a cell cavity formed in a device for mounting such specimen in a spectrometer, said device being provided with a first cavity extending inwardly from a face thereof, a second cavity of smaller cross-section than said first cavity and communicating with said first cavity and a third cell cavity of smaller cross-section than said second cavity and communicating with said second cavity but being otherwise closed, said method comprising forming a first solution by dissolving the sample in a first solvent introducing said first solution into said first cavity, evaporating said solvent until said sample is deposited in solid form on the walls of said cell cavity, introducing a second solvent optically transparent to the radiation of the spectrometer into said first cavity, causing said sample to dissolve in said second solvent and concentrating said second solvent until it substantially completely fills said cell cavity without extending substantially into said second cavity, and closing said cell cavity to the substantial exclusion of air.

For further understanding of the various features of the invention, reference is directed to the accompanying drawings which serve both to illustrate a cell constructed in accordance with the invention as well as to demonstrate a manner of filling a cell which also forms part of the subject matter of the present invention.

Figure 1 shows a perspective view of a cell-containing device;

Figure 2 is a central vertical section of the device seen in Figure 1;

Figure 3 is a view similar to Figure 2 showing a first stage in the charging process;

Figure 4 is an elevation view of a condenser for use with this device;

Figure 5 is an overall view on a smaller scale showing the condenser of Figure 4 in use with such device, as well as the application of heating thereto;

Figure 6 is an enlarged portion of Figure 5 showing the effect of the application of heat;

Figure 7 is a view similar to Figure 2 showing a later stage in the process;

Figure 8 is an elevation view of a plug for use in the device of the preceding figures;

Figure 9 is a view showing this plug being inserted into such device at a later stage in the process;

Figure 10 is a view at a slightly later stage in the process than Figure 9, with the plug fully inserted in such body; and Figure 11 is a section similar to Figure 2 showing a modification.

It is proposed, by way of illustration, to assume that an ultra-microscopic sample (say 10 micrograms) of an organic compound, which is the total material available, is to be examined in an infrared spectrometer. Such an amount of matter when placed on a glass slide would appear as no more than a smear.

Since it is being assumed that an infrared examination is to be made, the cell-containing device will be made of a material optically transparent to infrared radiation. Numerous suitable materials are known. These are normally chosen from the alkali metal halides, although a silver halide is sometimes used. Other materials that may be used are barium, calcium and lead halides; also arsenic trisulphide. Sodium chloride in the form of natural or synthetic rock salt is the most readily available material commercially. As previously mentioned, when rock salt is used, there is a requirement that it must be in the form of a single crystal, but there is no difficulty in obtaining crystals of rock salt of sufficient size, as they can be readily synthesised. A device such as that seen in Figures 1 and 2 would require typical dimensions of about 2 centimeters long, 0.8 centimeter wide and 0.6 centimeter thick. Pieces of rock salt crystal of this size are, in fact, readily available as scrap left over from the manufacture of larger optical bodies.

If ultraviolet or visible radiation is being employed, the material of the carrier body may be quartz crystal, or in some cases one of the optical glasses available and having suitable optical transparency.

It will be assumed, however, for the purposes of the subsequent description that infrared spectrometry is concerned and that the cell-containing device is formed from rock salt.

As shown in Figures 1 and 2, this device consists of an elongated body 10 drilled to provide a first main central cavity 11 (which will be subsequently referred to as the "flask"), the tapered end surfaces of this flask 11 connecting with a second cavity 12 (which will be referred to as the "neck") which in turn leads to a final cavity 13 which constitutes the cell. The diameter of these cavities decreases seriatim. In a typical embodiment of the invention, the length of the cell 13 will be approximately within the range of 1 to 1.5 millimeters in length, with the diameter about 0.25 millimeter. The diameter could be reduced down to about 0.15 millimeter in extreme cases and might be as large as about 0.5 millimeter, while still remaining in the ultra-microscopic range. As will be subsequently explained more fully, although the invention is particularly useful in the mounting of ultra-microscopic samples, it also has important application in the microscopic and macroscopic ranges, when the size of the cell can be substantially increased. The cell 13 illustrated in the drawings is assumed to have a diameter of 0.25 millimeter and a length of 1.5 millimeters.

The diameter of the neck 12 should preferably be not more than three times that of the cell 13. And the length of the neck 12 should be related to the length of the cell 13 so that the neck will contain not more than ten times the volume of the cell 13. The diameter of the flask 11 will clearly be much greater than that of the neck 12 and cell 13, but it bears no critical relationship thereto. Every effort should be made to ensure that the surfaces joining the three different cavities extend smoothly into one another so that there should be as little opportunity as possible for material to lodge in crevices formed in the transitional surfaces.

Two of the outer faces of the body 10 will be smoothly polished, i.e. the surface 14 shown in Figure 1 and the face opposite thereto. It is convenient not to polish the other sides, i.e. the face 15 and the face opposite it, in order to ensure that the cell is always oriented in the same way with the radiation entering at the face 14 and leaving through the opposite rear face, or vice versa. It is important for uniformity of results that the device should not become turned through 90° during different examinations, and one of the faces should be marked so that the radiation will always pass through the cell in the same direction.

It is now being assumed that 10 micrograms of the sample is available. This sample is dissolved in about 0.1 cc. of a suitable solvent, typical solvents being carbon disulphide, di-ethyl ether, methylene chloride, and hydrocarbons such as benzene, pentane, or hexane. The basic requirements for the solvent, beyond the fact that it must readily dissolve the sample, are that it should have a boiling point below about 100° C., and that it be chemically inert to the sample and to rock salt. It is not essential that this solvent have the necessary optical transparency that will be necessary in the final solvent in which the sample is dissolved.

The solution thus formed is transferred, a few drops at a time, to the flask 11 from which it flows down into the neck 12 as shown in Figure 3. Air trapped in the cell 13 will prevent the liquid flowing into the cell.

Before describing the next step in the process, attention is directed to Figure 4 which shows a condenser 16 consisting of a generally cylindrical solid body of a material having high thermal conductivity, such as aluminum, formed with a series of cooling vanes 17. At its lower end, the condenser 16 is provided with a curved finger 18 that serves as the condensing surface.

Returning to the process of charging the cell 13, Figure 5 shows the manner in which the body 10 in the condition shown in Figure 3 is mounted on a heater 19, the condenser 16 being placed loosely on the top of the body 10 with the finger 18 projecting into the top of the flask 11 to touch or nearly touch one of the walls thereof. Heat is gently applied by the heater 19, causing the rate of evaporation of solution in the lower end of the flask 11 and the neck 12 to be enhanced. The air is thus driven out of the cell 13. The cell is next transferred briefly to a cold plate when the vapour by condensation will fill the cell. Heating is recommenced and the solvent is gradually evaporated. As demonstrated by the large scale view of Figure 6, the condenser 16 acts as a reflux condenser, the finger 18 condensing some of the solvent which thus runs back down the walls of the flask 11 to wash down with it any of the sample which may have remained on the walls during evaporation. The loose mounting of the condenser 16 on top of the body 10 permits slow escape of vapour from the system. In this manner the solution in the lower part of the flask 11, the neck 12 and the cell 13 is gradually diminished in volume and increased in concentration. As this continues, more and more of the initially prepared solution is added a few drops at a time to the flask 11, until finally all the solution containing all the sample has been introduced into the flask 11. The gentle heating continues preferably until all the solvent has been evaporated, the result being a smear of the sample on the walls of the cell 13, or at least those of the cell 13 and neck 12. The reflux condenser normally continues to be used to the very end of this process to keep the walls washed and prevent creep of the sample up the walls. The device is then examined under the microscope and if the sample is not all in the cell 13, it will be necessary to place some additional pure solvent into the system and continue the evaporation process. The refluxing feature is normally very valuable at this stage, but, if difficulty is experienced in obtaining all the residual sample in the cell 13, this operation can be assisted by placing the device in a centrifuge.

After the sample has thus been transferred to the walls of the cell 13, a small amount of the final solvent is added. In addition to having the properties of the first solvent, this final solvent must be optically transparent in respect of the radiation employed in the spectrometer, i.e., in the present example, infrared radiation. Solvents optically transparent to infrared radiation that may be used, are carbon tetrachloride, carbon disulphide, or chloroform, although there are other solvents that may be used in special cases. Enough of this second solvent is added approximately to fill the cell 13 and the neck 12, although initially it will not flow into the cell 13 because of the entrapped air. This stage of the process is shown in Figure 7.

A second heating step, which performs both a dissolving and an evaporating function, is then carried out. This can be accompanied by use of the centrifuge, and in certain cases it might even be possible to substitute the centrifuging operation completely for the heating one. Again, the use of the reflux condenser is often helpful in aiding the process.

This step continues until the specimen has been evaporated down to the stage where just the cell 13 is completely full (see Figure 9). While it is important that the cell 13 should be completely full so that no air is trapped in the cell when the stopper is inserted in the neck, on the other hand, it is undesirable that there should be any substantial amount of liquid extending up into the neck, because this will be wasted. The device can be transferred to a cold plate to halt evaporation quickly, once the correct level has been achieved.

Figure 8 shows a view of a plug 20 which carries at one end a stopper portion 21, and Figure 9 shows this plug 20 in the course of insertion into the body 10. The plug 20 is formed of a resilient material, inert both to the solvent and to the rock salt. A suitable material is the synthetic resin known under the trademark Teflon. The stopper portion 21 of the plug 20 forms a resilient but firm fit in the neck 12. During insertion it squeezes all the air out of the neck and up into the flask. A small amount of the specimen may escape at the same time, but this amount can be kept to a minimum by the exercise of care and skill in performing the operation.

The final assembly shown in Figure 10 is now suitable for mounting in an infrared spectrometer having a microilluminator, the latter being equipment for forming an extremely highly focused beam of radiation for use with specimens of such small size.

One of the advantages of the cell charging process above described is the ability to use different solvents at the two liquid stages. The necessity for optical transparency severely restricts the solvents usable in the final stage, but there is much greater choice available in the initial stage when the sample is being transferred to the cell. This aspect, which is new with the present invention, enables the first solvent to be chosen with more view to other desirable properties, in particular the solubility of the sample in it. The manipulative steps of transferring the sample to the cell are thus freed of all limitations consequent upon the use of an optically transparent solvent.

On the other hand, should an optically transparent solvent be well suited for the transference of a particular sample, there is no reason why it cannot be used to form the initial solution. Then, subject only to the need for inspection under a microscope to ensure that none of the sample has been deposited on the walls of the flask or neck, it is unnecessary to evaporate all the solvent during the initial evaporation part of the process. Instead of evaporating down to a dry sample in the cell, with the subsequent addition of more of the same solvent to make up the specimen, the evaporating process can be halted when only the cell remains filled. If, however, difficulties of inspection arise using this shortened method, the full method is to be preferred.

In addition to the manipulative steps of transferring a very small sample to a cell for viewing in a spectrometer, the invention provides an especially convenient cell structure. In contra-distinction to prior cell-containing devices which, by comparison, are complex precision instruments, the present cell has the merit of extreme simplicity, consisting of nothing more than a small block of rock salt (or other suitable crystal) drilled with three communicating cavities graduated in cross-section down to the final one suitable for containing the specimen.

It is not, however, an essential feature of a cell constructed according to the invention that there be three cavities. The invention has application to the mounting of microscopic and macroscopic quantities of a sample, under which conditions the specimens will be correspondingly larger in volume. When a larger specimen is to be used the three stage cavity arrangement can be replaced by a two stage arrangement, as shown in Figure 11, the cell 13' then being effectively a continuation of the neck 12, the diameters being the same. Basically the same manipulative steps would be involved in filling such a cell. Working in the microscopic range, the cell could have a diameter up to say 1 millimeter which is approximately the diameter of the neck in the embodiment illustrated, and a length of say from 0.5 to 1 centimeter. In the macroscopic range, the diameter could be increased perhaps to about 1.5 millimeters, and the length could conveniently be of the order of 1.5 centimeters. On the other hand, even when working in the macroscopic and microscopic ranges, the three cavity structure can be retained, if desired.

It has been found that the drilling of rock salt crystals in the manner required for the invention presents no great difficulty. To date three separate drills have been employed, but clearly a single, stepped drill could be employed. It is only necessary to exercise normal caution when dealing with rock salt which is quite brittle and to drill slowly with the aid of lubricants. The inner walls of the cavities can be smoothed subsequent to the drilling by rinsing quickly with a mixture of alcohol and water, with a subsequent rinse with alcohol. The first rinse must be of short duration as the rock salt is soluble in water. This rinse will inevitably increase the size of the cavity slightly, but this will not be seriously detrimental and it will serve to eliminate any substantial irregularities on the surfaces of the cavities.

We claim:

1. A device for mounting a specimen for spectrometric examination, said device comprising a unitary body formed from a single piece of a material chemically inert to the specimen and optically transparent to the radiation of the spectrometer, said body being provided with a first cavity extending inwardly from a face thereof and a second cavity communicating with said first cavity but otherwise closed, said second cavity having a substantially smaller cross-section than said first cavity, said second cavity being hollowed out of said unitary body so as to have continuous walls uninterrupted by any division of said body.

2. A device as claimed in claim 1, including a resilient closure member adapted to engage firmly with said body to trap a small fluid specimen in a cell constituted by at least a part of said second cavity.

3. A device for mounting a specimen for infrared spectrometric examination, said device comprising a unitary body formed from a single block of a material selected from the group consisting of alkali metal halides, barium halides, calcium halides, lead halides, silver halides and arsenic trisulphide, said body being provided with a first cavity extending inwardly from a face thereof and a second cavity communicating with said first cavity but otherwise closed, said second cavity having a substantially smaller cross-section than said first cavity, said second cavity being hollowed out of said unitary body so as to have continuous walls uninterrupted by any division of said body.

4. A device as claimed in claim 3, including a resilient closure member adapted to engage firmly with said body to trap a small fluid specimen in a cell constituted by at least a part of said second cavity.

5. A device for mounting a specimen for infrared spectrometric examination, said device comprising a unitary body formed from a single crystal of rock salt, said body being provided with a first cavity extending inwardly from a face thereof and a second cavity communicating with said first cavity but otherwise closed, said second cavity having a substantially smaller cross-section than said first cavity, said second cavity being hollowed out of said unitary body so as to have continuous walls uninterrupted by any division of said body.

6. A device as claimed in claim 5, including a resilient closure member adapted to engage firmly with said body to trap a small fluid specimen in a cell constituted by at least a part of said second cavity.

7. A device for mounting a specimen for ultraviolet spectrometric examination, said device comprising a unitary body formed from a single piece of quartz, said body being provided with a first cavity extending inwardly from a face thereof and a second cavity communicating with said first cavity but otherwise closed, said second cavity having a substantially smaller cross-section than said first cavity, said second cavity being hollowed out of said unitary body so as to have continuous walls uninterrupted by any division of said body.

8. A device for mounting a specimen for spectrometric examination, said device comprising a unitary body formed from a single piece of a material chemically inert to the specimen and optically transparent to the radiation of the spectrometer, said body being provided with a first cavity extending inwardly from a face thereof, a second cavity communicating with said first cavity and of substantially smaller cross-section than said first cavity, and a third cavity constituting a cell for the specimen and communicating with said second cavity but being otherwise closed, said third cavity being of smaller cross-section than said second cavity, said third cavity being hollowed out of said unitary body so as to have continuous walls uninterrupted by any division of said body.

9. A device as claimed in claim 8, including a resilient closure member adapted to engage firmly in said second cavity whereby to trap a small fluid specimen in said cell.

10. A device for mounting a specimen for infrared spectrometric examination, said device comprising a unitary body formed from a single block of a material selected from the group consisting of alkali metal halides, barium halides, calcium halides, lead halides, silver halides and arsenic trisulphide, said body being provided with a first cavity extending inwardly from a face thereof, a second cavity communicating with said first cavity and of substantially smaller cross-section than said first cavity, and a third cavity constituting a cell for the specimen and communicating with said second cavity but being otherwise closed, said third cavity being of smaller cross-section than said second cavity, said third cavity being hollowed out of said unitary body so as to have continuous walls uninterrupted by any division of said body.

11. A device as claimed in claim 10, including a resilient closure member adapted to engage firmly in said second cavity whereby to trap a small fluid specimen in said cell.

12. A device for mounting a specimen for infrared spectrometric examination, said device comprising a unitary body formed from a single crystal of rock salt, said body being provided with a first cavity extending inwardly from a face thereof, a second cavity communicating with said first cavity and of substantially smaller cross-section than said first cavity, and a third cavity constituting a cell for the specimen and communicating with said second cavity but otherwise closed, said third cavity being of smaller cross-section than said second cavity, said third cavity being hollowed out of said unitary body so as to have continuous walls uninterrupted by any division of said body.

13. A device as claimed in claim 12, including a resilient closure member adapted to engage firmly in said second cavity whereby to trap a small fluid specimen in said cell.

14. A device for mounting a specimen for ultraviolet spectrometric examination, said device comprising a unitary body formed from a single piece of quartz, said body being provided with a first cavity extending inwardly from a face thereof, a second cavity communicating with said first cavity and of substantially smaller cross-section than said first cavity, and a third cavity constituting a cell for the specimen and communicating with said second cavity but otherwise closed, said third cavity being of smaller cross-section than said second cavity, said third cavity being hollowed out of said unitary body so as to have continuous walls uninterrupted by any division of said body.

15. A method of spectrometric examination comprising setting up a sample-containing specimen in a cell cavity formed in a device having a main cavity communicating with said cell cavity, forming a solution by dissolving the sample in a solvent, introducing said solution into said main cavity, concentrating said solution by evaporating said solvent in such a manner as to confine said sample to said cell cavity, and mounting said device in a spectrometer in a position to pass the spectrometer rays through said confined sample in said cell cavity.

16. A method for setting up a sample-containing specimen in a cell cavity formed in a device for mounting such specimen in a spectrometer and having a main cavity communicating with said cell cavity, said method comprising forming a first solution by dissolving the sample in a first solvent, introducing said first solution into said main cavity and evaporating said solvent in such a manner as to deposit said sample in solid form in said cell cavity, introducing a second solvent into said cell cavity to form with said sample a second solution, concentrating said second solution in said device by evaporating said second solvent in such a manner as to confine said second solution to said cell cavity, and sealing said cell cavity with a closure member.

17. A method for setting up a sample-containing specimen in a cell cavity formed in a device for mounting such specimen in a spectrometer, said device being provided with a first cavity extending inwardly from a face thereof, a second cavity of smaller cross-section than said first cavity and communicating with said first cavity and a third, cell cavity of smaller cross-section than said second cavity and communicating with said second cavity but being otherwise closed, said method comprising forming a solution by dissolving the sample in a solvent optically transparent to the radiation of the spectrometer, introducing said solution into said first cavity, evaporating said solvent until said solution has been concentrated to fill said cell cavity without extending substantially into said second cavity, and introducing a closure member into said second cavity to confine said solution in said cell cavity as a specimen to the substantial exclusion of air.

18. A method as claimed in claim 17, wherein said evaporating step is effected by heating said device under reflux condensation conditions.

19. A method as claimed in claim 17, including the step of subjecting said device to the action of a centrifuge during said evaporating step.

20. A method for setting up a sample-containing specimen in a cell cavity formed in a device for mounting such specimen in a spectrometer, said device being provided with a first cavity extending inwardly from a face thereof, a second cavity of smaller cross-section than said first cavity and communicating with said first cavity and a third, cell cavity of smaller cross-section than said second cavity and communicating with said second cavity but being otherwise closed, said method comprising forming a first solution by dissolving the sample in a first solvent, introducing said first solution into said first cavity, evaporating said solvent until said sample is deposited in solid form on the walls of said cell cavity, introducing a second solvent optically transparent to the radiation of the spectrometer into said first cavity, causing said sample to dissolve in said second solvent and concentrating said second solvent until it substantially completely fills said cell cavity without extending substantially into said second cavity, and closing said cell cavity to the substantial exclusion of air.

21. A method as claimed in claim 20, wherein said evaporating and concentrating steps are effected by heating said device under reflux condensation conditions.

22. A method as claimed in claim 20, including the step of subjecting said device to the action of a centrifuge during at least one of said evaporating and concentrating steps.

References Cited in the file of this patent

UNITED STATES PATENTS

| | | |
|---|---|---|
| 2,351,282 | Oliver | June 13, 1944 |
| 2,423,158 | Runge et al. | July 1, 1947 |
| 2,637,817 | Herbert | May 5, 1953 |
| 2,650,307 | Koppius | Aug. 25, 1953 |
| 2,690,695 | Coates | Oct. 5, 1954 |
| 2,805,339 | Laird | Sept. 3, 1957 |
| 2,810,835 | Miller | Oct. 22, 1957 |
| 2,819,402 | Watson et al. | Jan. 7, 1958 |
| 2,858,444 | Leisegang | Oct. 28, 1958 |